United States Patent

Jeon et al.

Patent Number: 5,937,101
Date of Patent: Aug. 10, 1999

[54] POST-PROCESSING DEVICE FOR ELIMINATING BLOCKING ARTIFACT AND METHOD THEREFOR

[75] Inventors: Byeung-woo Jeon, Seongnam; Je-chang Jeong, Seoul, both of Rep. of Korea

[73] Assignee: Samsung Electronics Co., Ltd., Kyungki-do, Rep. of Korea

[21] Appl. No.: 08/588,700

[22] Filed: Jan. 19, 1996

[30] Foreign Application Priority Data

Jan. 20, 1995 [KR] Rep. of Korea .................... 95-951

[51] Int. Cl.$^6$ ............................................. G06K 9/40

[52] U.S. Cl. .................... 382/268; 382/275; 382/232; 382/254; 358/433

[58] Field of Search ............................. 382/268, 266, 382/275, 232, 233, 248, 251, 254; 358/432, 433; 348/420

[56] References Cited

U.S. PATENT DOCUMENTS

| | | | |
|---|---|---|---|
| 5,450,531 | 9/1995 | Ng et al. | 382/266 |
| 5,590,064 | 12/1996 | Astle | 382/268 |

*Primary Examiner*—Thomas D. Lee
*Attorney, Agent, or Firm*—Sughrue, Mion, Zinn, Macpeak & Seas, PLLC

[57] ABSTRACT

A post-processing device for eliminating a blocking artifact generated upon reconstructing an image compressed by block transform operation and a method thereof minimize a blocking artifact at block boundaries by selecting a predetermined discrete cosine transform (DCT), estimating transform coefficients with respect to the information lost upon quantization or inverse quantization to have the highest continuity with respect to adjacent blocks, performing an inverse transform operation on the estimated transform coefficients, and adding the thus-obtained adjustment value to an inverse-transform-operated reconstructed image signal.

24 Claims, 8 Drawing Sheets

POST-PROCESSING DEVICE FOR ELIMINATING BLOCKING ARTIFACT AND METHOD THEREFOR

BACKGROUND OF THE INVENTION

The present invention relates to a post-processing device for eliminating a blocking artifact and a method thereof, and more particularly, to a post-processing device for minimizing a blocking artifact where a discontinuity occurs among adjacent blocks in a device for restoring image data compressed by a block transform operation, and a method thereof.

There are various standard methods for encoding video (and audio) signals into a digital signal for transmission or storage, and decoding the transmitted or stored result for reproduction. These methods, however, produce very large amounts of encoded digital video data. Therefore, in order to decrease the total amount of data, redundancy contained in the digital image signal is eliminated by coding techniques such as transform coding, differential pulse code modulation, quantization, and variable-length coding.

Figure 1:
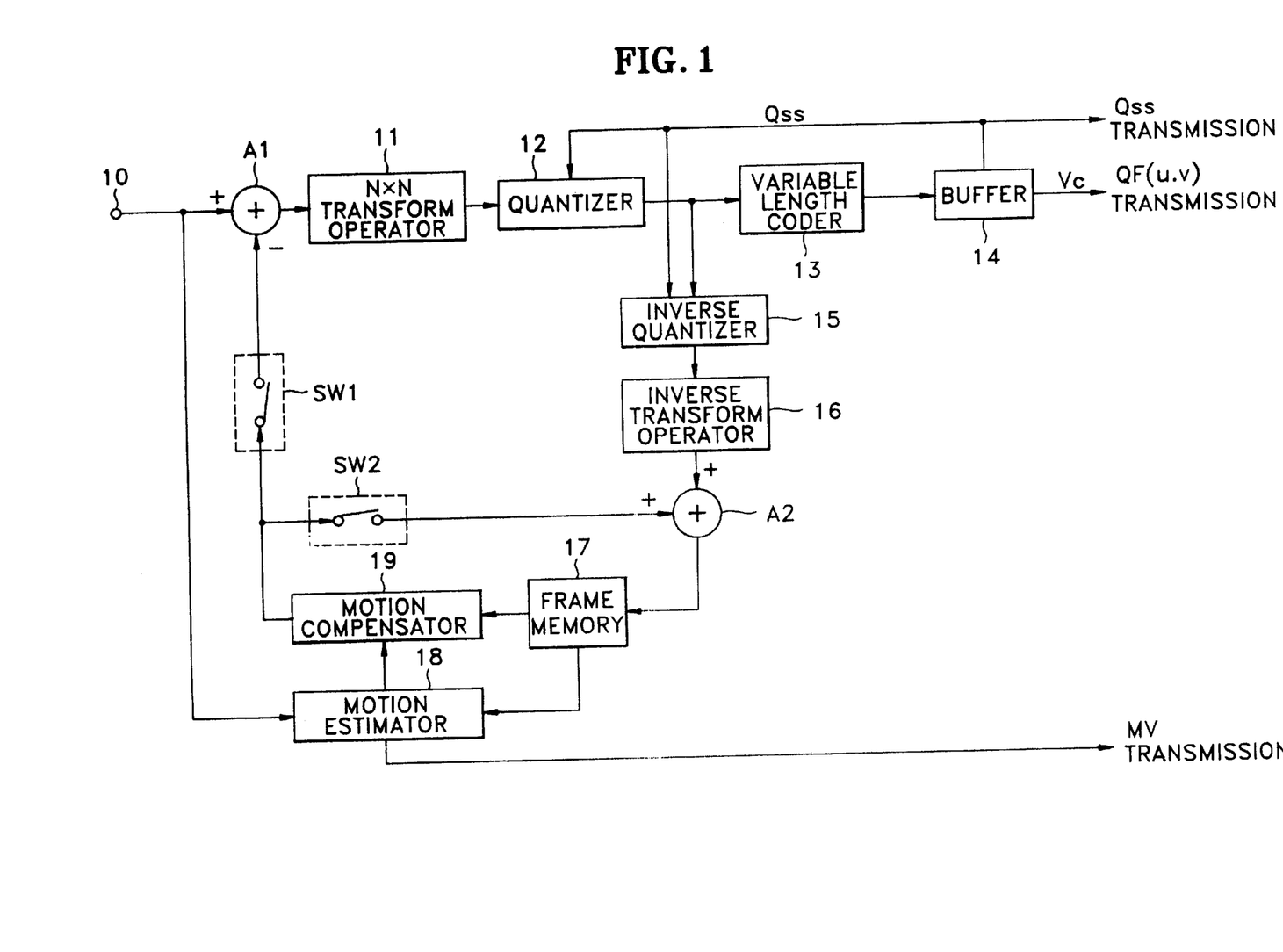
FIG. 1 is a block diagram showing a general encoder of image data.

FIG. 1 is a block diagram schematically showing a general coder of image data. The device roughly comprises means 11 and 12 for transforming an input image signal into a frequency domain signal by block units and quantizing a transform coefficient, means 13 and 14 for variable-length-coding the quantized data, and means 15, 16, 17, 18, 19, A1, A2, SW1 and SW2 for inverse quantizing and performing an inverse-transform operation on the quantized data so as to perform motion compensation, to thereby encode image data in an intramode or in an intermode.

Figure 2:
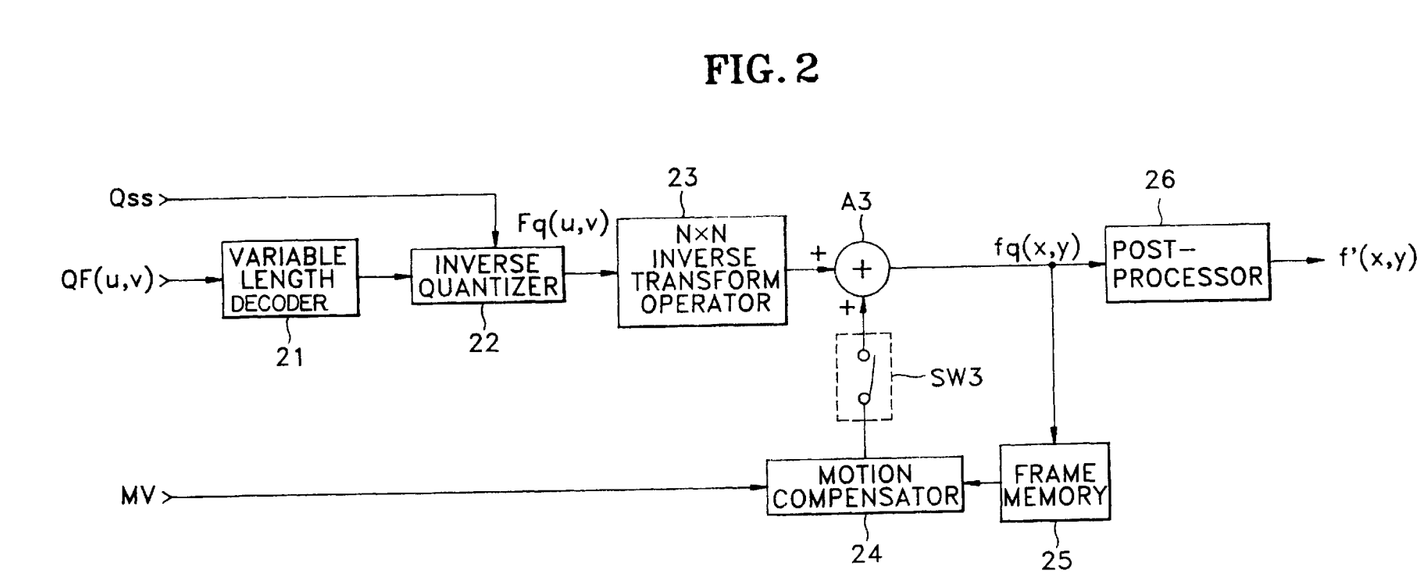
FIG. 2 is a block diagram showing a general decoder and post-processing device of image data.

In addition, FIG. 2 is a block diagram schematically showing a general decoder and a post-processing device of image data, for decoding image data which has been coded by the coder shown in FIG. 1 and reproducing the decoded result. The operation of the circuit shown in FIG. 2 is as follows.

Coded image data QF(u,v) is decoded by a variable-length decoder 21 for output to an inverse quantizer 22. Here, the magnitude of the output transform coefficient is controlled by a quantization step size Qss provided by the coder (FIG. 1). Then, an N×N inverse transform operator 23 performs a transform operation on a transform coefficient of a frequency domain provided by inverse quantizer 22 to output image data of a space domain.

The data compression with respect to each block in N×N inverse transform operator 23 shown in FIG. 1, employs a discrete cosine transform (DCT), Walsh-Hadamard transform (WHT), discrete Fourier transform (DFT) or discrete sine transform (DST) method. For example, if data compression is performed by employing the DCT method, a two-dimensional forward DCT function (equation 1) and an inverse DCT function (equation 2) with respect to pixel $P_{(y,x)}$ can be defined as follows.

$$S_{(v,u)} = \frac{1}{4} C_u C_v \sum_{x=0}^{7} \sum_{y=0}^{7} P_{(y,x)} \cos\left[\frac{u\pi(2x+1)}{16}\right] \cos\left[\frac{v\pi(2y+1)}{16}\right] \quad (1)$$

$$P_{(y,x)} = \frac{1}{4} \sum_{x=0}^{7} \sum_{y=0}^{7} S_{(v,u)} C_u C_v \cos\left[\frac{u\pi(2x+1)}{16}\right] \cos\left[\frac{v\pi(2y+1)}{16}\right] \quad (2)$$

Here, u, v, y and x are integers from 0 to 7, and $C_u$ and $C_v$ are both equal to $1/\sqrt{2}$ when u and v are both zero and are otherwise equal to one.

A motion vector MV from the coder (FIG. 1) is provided to a motion compensator 24 of a decoder. Motion compensator 24 reads an N×N block corresponding to the motion vector from the previous frame data stored in a frame memory 25, performs motion compensation and provides the result to an adder A3. The adder A3 sums the inverse DCT data and the N×N block data and outputs the result to a post-processor 26 for restoring the original image from a received distorted image. That is, if the received signal is image data compressed by block units, blocking artifacts are generated. A blocking artifact is a discontinuity which occurs among adjacent blocks and is a form of distortion.

Therefore, in a conventional device, to reduce the generation of blocking artifacts, a low-pass filtering operation is performed spatially for boundary pixels. However, post-processing in a transform domain rather than a space domain simplifies the decoder structure, and it is also effective.

Accordingly, as disclosed by Chung-nan Tien and Hseuh-ming Hang in "Transform-domain Postprocessing of DCT-coded Images" ('93 SPIE Proceedings, Vol. 2094, pp. 1627–1638), post-processing is performed using a compensated DCT coefficient, which will be explained with reference to FIG. 3 to FIG. 7.

Figure 3:
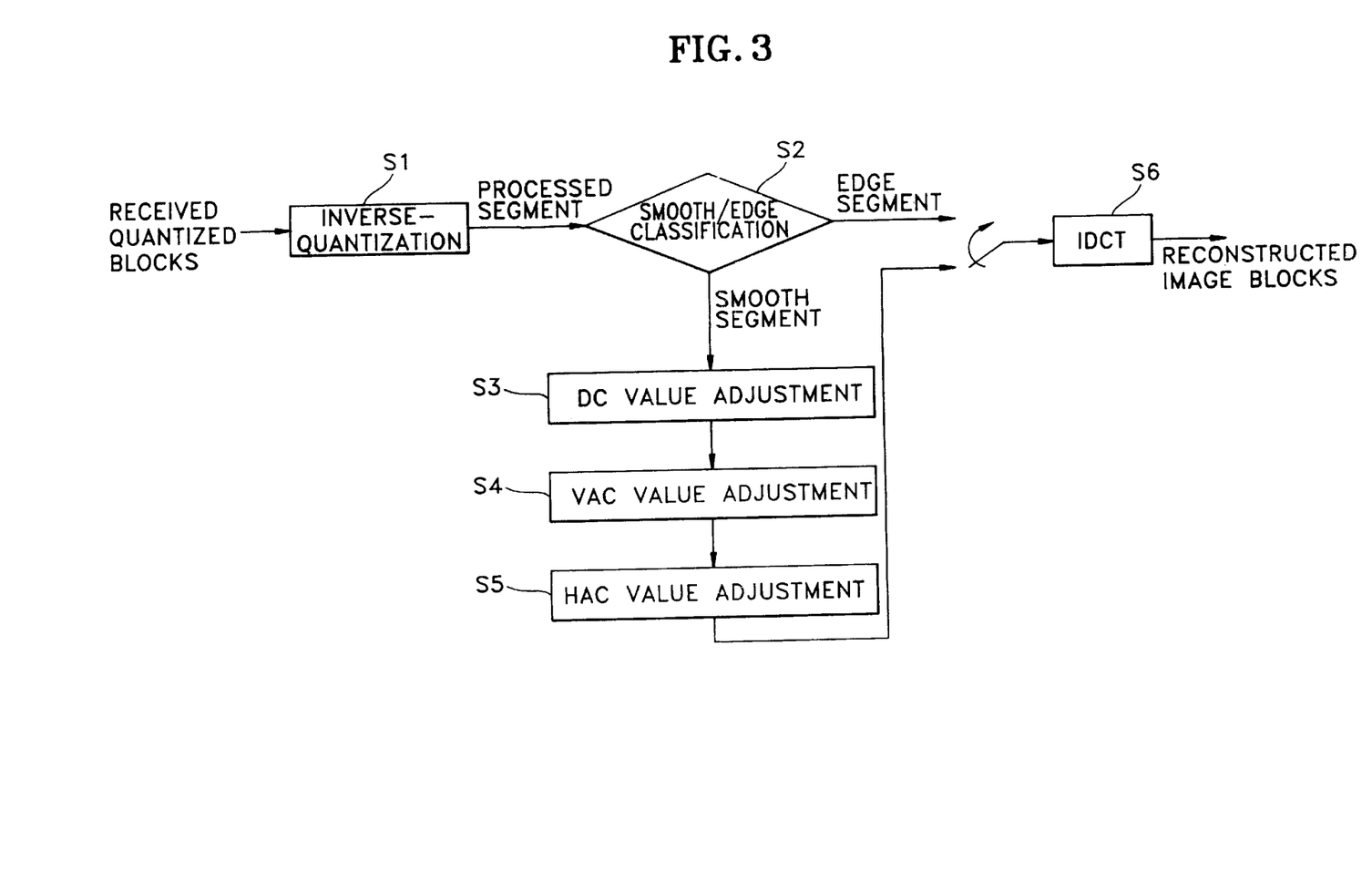
FIG. 3 is a flowchart illustrating a conventional post-processing method.

FIG. 3 is a flowchart illustrating the post-processing method.

Figure 4:
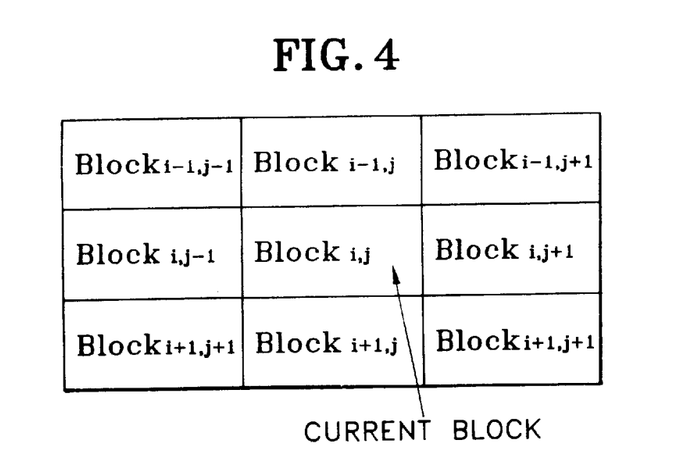
FIG. 4 illustrates a current block and adjacent blocks.

Referring to FIG. 3, received quantized blocks are inversely quantized (step 1), and a processed segment consisting of the current block and its eight neighboring blocks, as shown in FIG. 4, is classified is into smooth or edge segments (step 2). Since a blocking artifact is especially annoying in a smooth segment, post-processing (steps S3 to S5) is performed if a processed segment is smooth, and the processed segment is inversely transform-operated so as to output reconstructed image blocks if the processed segment is an edge segment (step S6).

First, the post-processing (steps S3 to S5) will be explained in more detail.

If the classified segment is a smooth segment, a DC value is adjusted (step S3). Here, since the DC value indicates an average luminance of the image block, an overall image block luminance level can be changed by adjusting the DC value. In other words, a weighted averaging method for adjusting the DC value of the current block based on information of the adjacent blocks is employed to reduce discontinuity (blocking) among adjacent blocks. The DC value of a block$_{i,j}$ (DC$_{i,j}$) can be replaced with an adjusted DC value DC$_{adj(i,j)}$, for a smooth transition between adjacent blocks. Here, the adjusted DC value can be calculated as follows.

$$DC_{adj(i,j)} = \frac{\sum_{g=-1}^{1} \sum_{h=-1}^{1} DC_{i+g,j+h} WM_{gh}}{\sum_{g=-1}^{1} \sum_{h=-1}^{1} WM_{gh}} \quad (3)$$

Here, the weighted mask (WM), shown in the following expression (4), is selected by experience.

$$WM = \begin{bmatrix} 1 & 1 & 1 \\ 1 & 13 & 1 \\ 1 & 1 & 1 \end{bmatrix} \quad (4)$$

Though the average image intensity can be changed by adjusting the DC value, as described above, discontinuity may still remain, even when the discontinuity of the DC value of the adjacent blocks is lowered by the DC value adjustment, and a blocking artifact cannot be completely eliminated. Therefore, two additional transform coefficients need to be adjusted, inversely transform-operated and output. That is, the vertical and horizontal AC coefficients VAC and HAC, i.e., DCT coefficients (0,1) and (1,0), are adjusted (steps S4 and S5). Since the HAC and VAC operations are very similar, only the VAC operation will be described.

Using the forward DCT function of the above equation (1), the vertical AC coefficient for $S_{(v,u)}$ (where v=0 and u=1) is calculated.

$$S_{(0,1)} = \frac{1}{4}\frac{1}{\sqrt{2}}\sum_{x=0}^{7}\sum_{y=0}^{7}P_{(y,x)}\cos\left[\frac{\pi(2x+1)}{16}\right] \qquad (5)$$

Here, $S_{(0,1)}$ is a vertical AC coefficient (VAC). The amount of pixel values in a space region, which is affected by the vertical AC coefficient is calculated by an inverse DCT operation of the above equation (2).

$$P_{(y,x)} = \frac{1}{4}\frac{1}{\sqrt{2}}VAC\cos\left[\frac{\pi(2x+1)}{16}\right] \qquad (6)$$

As can be seen in the above expression (6), a vertical AC coefficient is related only to the magnitude variation in the horizontal direction modulated by a cosine function. Accordingly, the VAC value reduces a blocking artifact across a vertical boundary and reestablishes continuity in the horizontal direction.

Figure 5:
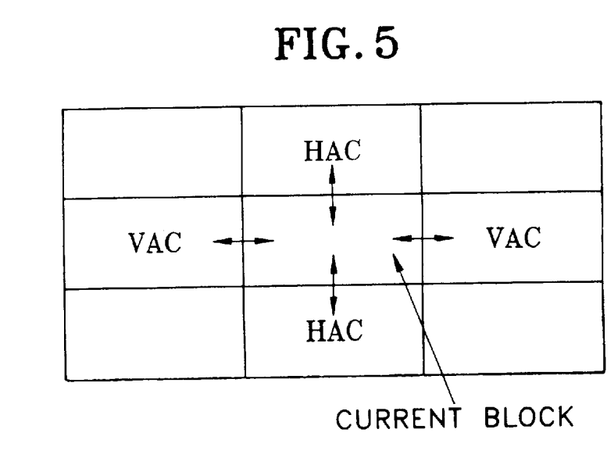
FIG. 5 illustrates adjacent blocks affected by VAC and HAC adjustment.

As shown in FIGS. 4 and 5, $\text{block}_{i,j-1}$, $\text{block}_{i,j}$ and $\text{block}_{i,j+1}$ are horizontally adjacent blocks and thus require VAC adjustment. The VAC adjustment is employed to remove a blocking artifact that remains after DC adjustment. Therefore, it is necessary to measure a gap between two adjacent blocks at their boundaries. Under the assumption that there is no acute variation in a block, the above expression (6) is employed to estimate a gap through the following processes.

First, intensities $P_{i,j}(\text{left})$ and $P_{i,j}(\text{right})$ correspond to the left and right boundaries of $\text{block}_{i,j}$ and can be expressed as follows.

$$P_{i,j}(\text{left}) = \frac{1}{4}\frac{1}{\sqrt{2}}VAC_{i,j}\cos\frac{\pi}{16} \qquad (7)$$
$$= 0.17654 VAC_{i,j}$$

and $$P_{i,j}(\text{right}) = \frac{1}{4}\frac{1}{\sqrt{2}}VAC_{i,j}\cos\frac{15\pi}{16} \qquad (8)$$
$$= 0.17654 VAC_{i,j}$$

Then, the right boundaries of $\text{block}_{i,j-1}$ and the left boundaries of $\text{block}_{i,j+1}$ can be expressed as follows.

$$P_{i,j-1}(\text{right}) = 0.17654 VAC_{i,j-1} \qquad (9)$$

and $$P_{i,j+1}(\text{left}) = 0.17654 VAC_{i,j+1} \qquad (10)$$

The gaps between adjacent block boundaries can be calculated as follows.

$$\text{gap}_{i,j}(\text{left}) = P_{i,j-1}(\text{right}) - P_{i,j}(\text{left}) \qquad (11)$$

$$\text{gap}_{i,j}(\text{right}) = P_{i,j}(\text{right}) - P_{i,j+1}(\text{left}) \qquad (12)$$

Figure 6:
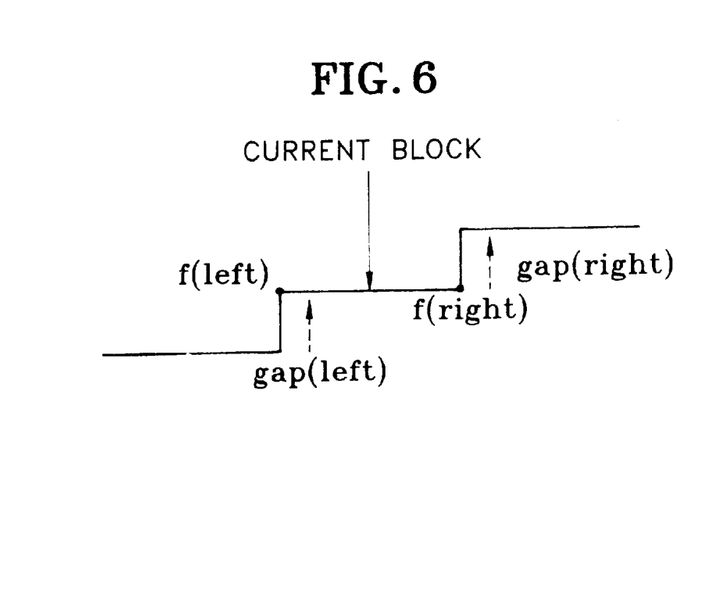
FIG. 6 illustrates an intensity and the gap between the adjacent blocks.

FIG. 6 shows an intensity and a gap between boundary intensities.

An average gap ($\text{gap}_{ave(i,j)}$) between the current block boundary and adjacent blocks can be expressed as follows.

$$\text{gap}_{ave(i,j)} = \frac{\text{gap}_{i,j}(\text{left}) - \text{gap}_{i,j}(\text{right})}{2} \qquad (13)$$

If the current block and the adjacent blocks have pixel values which are continuous in the horizontal direction, the value of $\text{gap}_{ave}$ is zero. A large $\text{gap}_{ave}$ value indicates a large discontinuity. Therefore, the discontinuity can be lowered by reducing the value of $\text{gap}_{ave}$. The gap adjustment is made by halving the average gap; that is, $\text{gap}_{adj}=\text{gap}_{ave}/2$. To reduce the gap of a boundary of $\text{block}_{i,j}$, $$VAC_{adj} = VAC_{i,j} + \frac{4\sqrt{2}\,\text{gap}_{adj}}{\cos(\pi/16)} \qquad (14)$$

Figure 7:
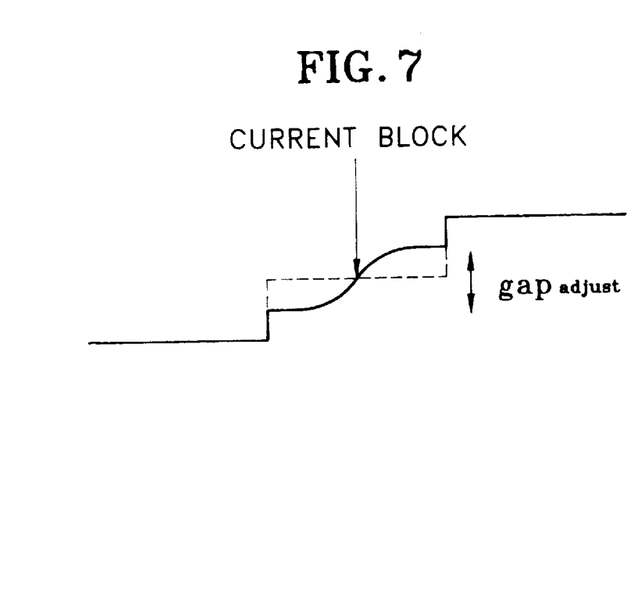
FIG. 7 illustrates an intensity of a block boundary after VAC adjustment.

An intensity of a block boundary after VAC adjustment is shown in FIG. 7. Here, HAC adjustment would be performed to reduce the vertical discontinuity in a similar method.

Since the above-described post-processing method employs a weighted average value for the DC value of peripheral blocks during adjusting DC value, and performs horizontal and vertical adjustments independently upon calculating horizontal and vertical AC adjustment values HAC and VAC, this method is not very effective for eliminating a blocking artifact.

SUMMARY OF THE INVENTION

Accordingly, it is an object of the present invention to provide a post-processing device for minimizing a blocking artifact by estimating a transform coefficient (adjustment value) with respect to the information lost upon quantization in order to minimize pixel differences between block boundaries, and adding the estimated signal to an original signal, in a device for reconstructing image data which has been compressed by block units.

It is another object of the present invention to provide a post-processing method performed by the above post-processing device.

To accomplish the first object of the present invention, there is provided a post-processing device for eliminating a blocking artifact with regard to a received image signal which has been subjected to a predetermined inverse-quantizing and inverse-transform-operation by block units, and reconstructing the original image, comprising: an input terminal for receiving an inverse-transform-operated image signal; adjustment coefficients calculating means for calculating a predetermined number of adjustment coefficients in a predetermined transform region which minimize the sum of pixel differences at boundaries between a current block of an image signal input via the input terminal and the adjacent blocks; adjustment value calculating means for calculating an adjustment value using the adjustment coefficients; adjustment control means for determining whether the inverse-transform-operated image signal is in an edge area or in a smooth area and outputting an adjustment control signal that determines whether to adjust the block image signal; and adding means for summing the adjustment value and the inverse-transform-operated image signal according to the adjustment control signal.

To accomplish the other object of the present invention, there is provided a post-processing method for eliminating a blocking artifact with regard to a received image signal which has been inverse-quantized and inverse-transform-operated by block units, and reconstructing the original image, the method comprising the steps of: (a) inputting an inverse-transform-operated image signal; (b) selecting a predetermined number of adjustment coefficients in the region where a selected transform operation is performed; (c) calculating adjustment coefficients for minimizing the sum of the pixel differences at boundaries between the current block and adjacent blocks; (d) calculating an adjustment value using the adjustment coefficient and adjustment factor value(s); (e) generating an adjustment control signal for determining whether to adjust the image signal according to the result of determination on whether the inverse-transform-operated image signal is in an edge area or in a smooth area; and (f) adding said calculated adjustment value to the inverse-transform-operated image signal according to the adjustment control signal.

BRIEF DESCRIPTION OF THE DRAWINGS

The above objects and other advantages of the present invention will become more apparent by describing in detail a preferred embodiment thereof is with reference to the attached drawings in which.

DETAILED DESCRIPTION OF THE INVENTION

An embodiment of a post-processing device for eliminating a blocking artifact and a method thereof will be explained by first describing how a blocking artifact is generated, with reference to FIG. 2.

An output signal of a variable-length decoder 21 shown in FIG. 2 is quantized by transform coefficients QF(u,v). Suppose F(u,v) represents a transform coefficient suffering no information loss generated during quantization or inverse quantization, and Fq(u,v) denotes a transform coefficient output by the inverse quantizer 22. Then, F(u,v) can be written as $$F(u,v)=Fq(u,v)+\Delta F(u,v) \tag{15}$$

where $\Delta F(u,v)$ is the information loss in the quantization step, and it is the cause of blocking artifact.

In the present invention, the value $\Delta F(u,v)$ is estimated and inverse-transform-operated. Then, the inverse-transform-operated adjustment value is added to signal fq(x,y), i.e., an inverse transform operation of Fq(u,v), to thereby effectively decrease the degree of blocking artifacts.

Figure 8:
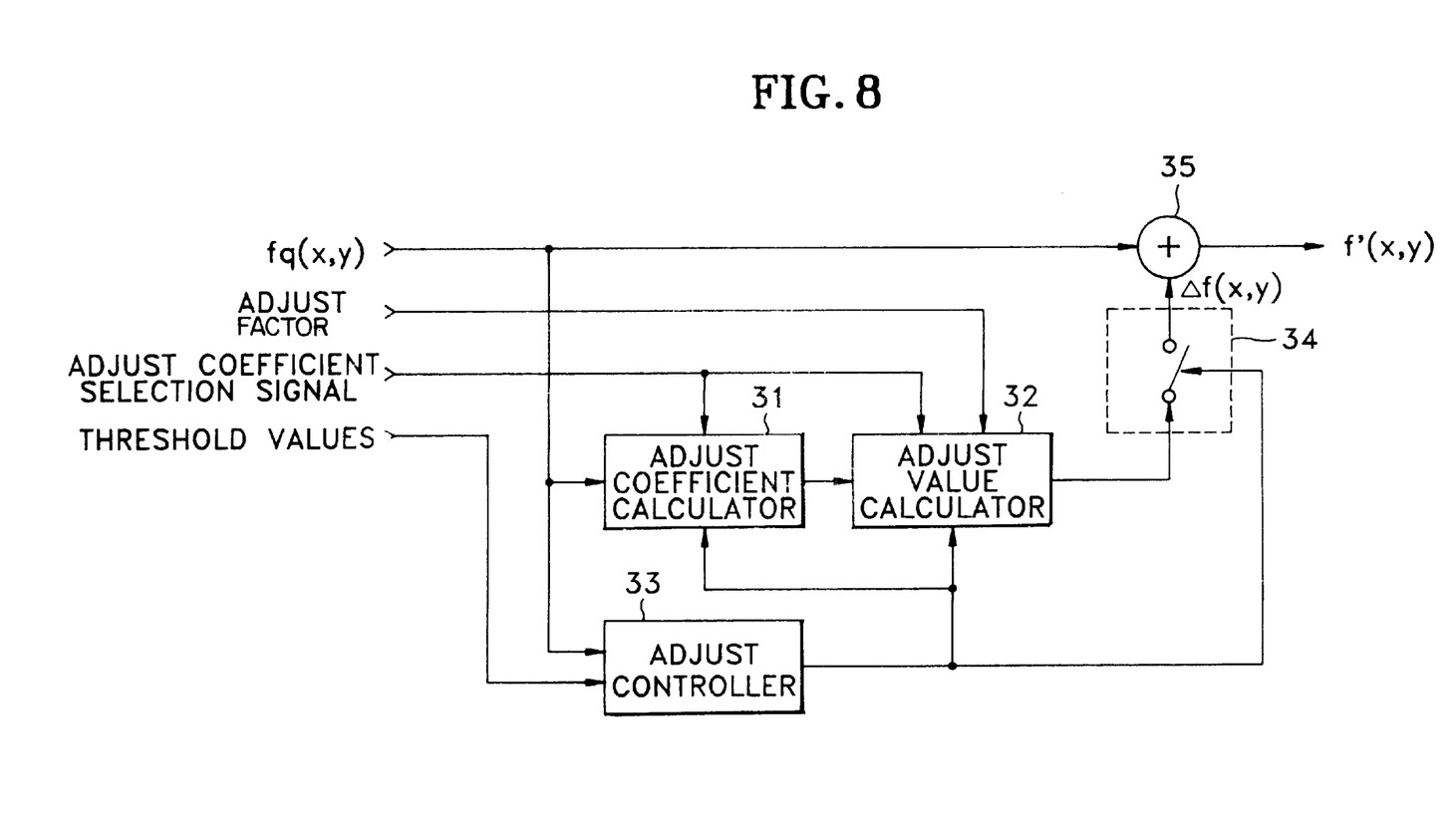
FIG. 8 is a block diagram of a post-processing device for eliminating a blocking artifact according to the present invention.

FIG. 8 is a block diagram showing an embodiment of a post-processing device for eliminating a blocking artifact according to the present invention.

Referring to FIG. 8, reference numeral 31 denotes an adjustment coefficient calculator for receiving the inverse-transform-operated original image signal fq(x,y) and an adjustment coefficient selection signal and calculating adjustment coefficients, reference numeral 32 denotes an adjustment value calculator for receiving the adjustment coefficient selection signal and adjustment coefficients calculated by adjustment coefficient calculator 31 and adjustment factor and calculating an adjustment value for minimizing pixel differences at a block boundary, reference numeral 33 denotes an adjustment controller for receiving the inverse-transform-operated original image signal fq(x,y) and an adjustment threshold value and outputting an adjustment control signal to adjustment coefficient calculator 31 and adjustment value calculator 32, reference numeral 34 denotes a selector for selectively outputting the adjustment value calculated by adjustment value calculator 32 according to the adjustment control signal from adjustment controller 33, and reference numeral 35 denotes an adder for summing the inverse-transform-operated original image signal fq(x,y) and the output of selector 34 and outputting a post-processed image signal f'(x,y). Here, the inverse-transform-operated original image signal fq(x,y) is input via adder A3 shown in FIG. 2, and the adjustment coefficient selection signal, the adjustment factor and the threshold value are supplied from a general system controller which is not shown.

In the operation of the device shown in FIG. 8, first, adjustment coefficient calculator 31 receives the inverse-transform-operated original image signal fq(x,y) and the adjustment coefficient selection signal and calculates selected coefficients.

When block size is N×N, the number of estimable coefficients of $\Delta F(u,v)$ is in general $N^2$. However, in practice, only those coefficients which are advantageous for eliminating a blocking artifact are selected and input to adjustment coefficient calculator 31 as a predetermined number of adjustment coefficient selection signals. The number of adjustment coefficient selection signals can be set from 1 to $N^2$. However, in the preferred embodiment of the present invention there are three such signals: $a_0$, $a_1$ and $a_2$.

Figure 9A:
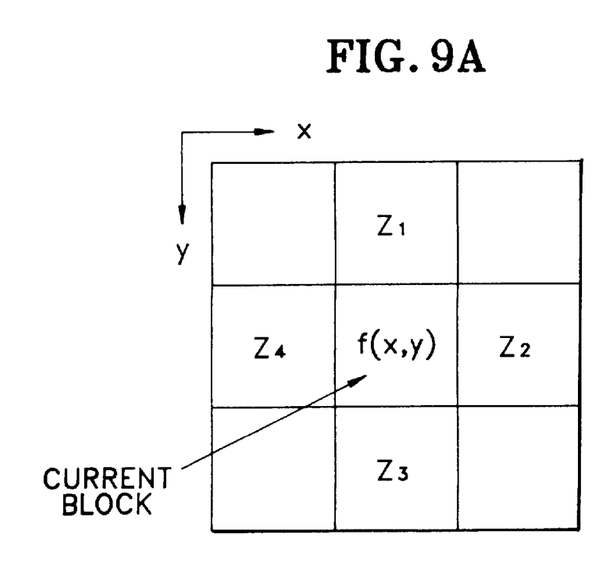
FIG. 9A and FIG. 9B illustrate the operation of the adjustment coefficient calculator shown in FIG. 8.
Figure 9B:
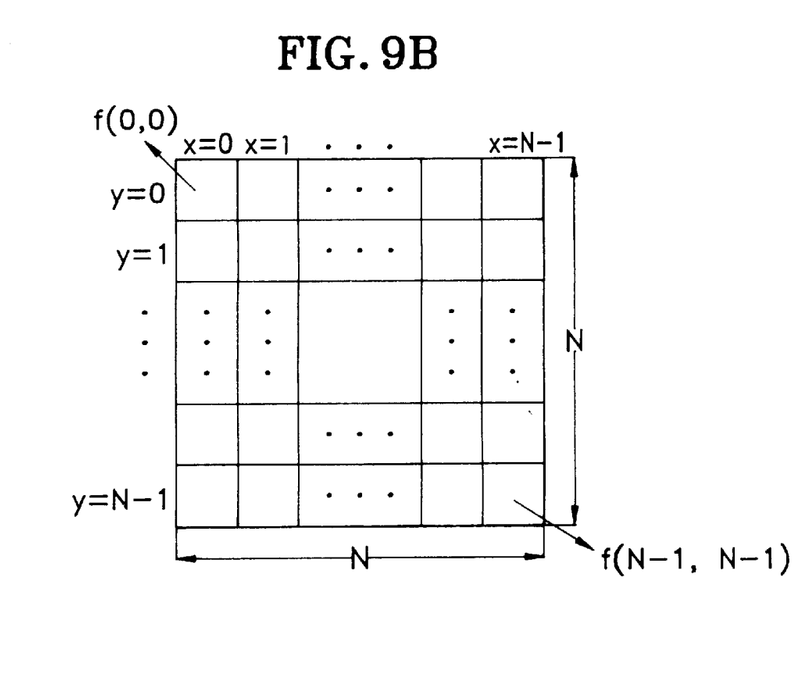

FIGS. 9A and 9B are for explaining the selection of an adjustment coefficient. In FIG. 9A, a pixel of a block to be processed is indicated as f(x,y), and the surrounding adjacent blocks are $Z_1$, $Z_2$, $Z_3$ and $Z_4$. FIG. 9B schematically illustrates each pixel of a current block whose size is N×N.

Here, an example where a compression technique employed for an adjustment is arbitrary and a two-dimensional DCT which is widely used by an image encoder and a decoder is employed in order to convert an image signal into horizontal and vertical frequency components will be explained.

If the adjustment coefficient selection signal indicates a DC coefficient of DCT and first-order cosine values (vertical and horizontal first-order components), the adjustment value $\Delta f(x,y)$ can be expressed as $$\Delta f(x, y) = a_0 + a_1 \cos\left[\frac{\pi(2X+1)}{2N}\right] + a_2 \cos\left[\frac{\pi(2y+1)}{2N}\right] \quad (16)$$

wherein $a_0$, $a_1$ and $a_2$ are adjustment coefficients calculated by adjustment coefficient calculator 31. A method of calculating the adjustment coefficients uses the value for minimizing the degree of discontinuity (D) at boundaries.

$$D(a_0, a_1, a_2) = \sum_{x=0}^{N-1} [Z_1(x, N-1) - fq(x, 0) - \Delta f(x, 0)]^2 + \quad (17)$$

$$\sum_{y=0}^{N-1} [Z_2(0, y) - fq(N-1, y) - \Delta f(N-1, y)]^2 +$$

$$\sum_{x=0}^{N-1} [Z_3(x, 0) - fq(x, N-1) - \Delta f(x, N-1)]^2 +$$

$$\sum_{y=0}^{N-1} [Z_4(N-1, y) - fq(0, y) - \Delta f(0, y)]^2$$

As can be seen by expression (17), discontinuity (D) can be expressed using variables $a_0$, $a_1$ and $a_3$ by substituting $\Delta f$ in equation (16).

When the three equations obtained by partially differentiating expression (17) with respect to $a_0$, $a_1$ and $a_3$ are equated with zero, adjustment coefficient values $â_1$, $â_2$ and $â_3$ which minimize equation (17) are obtained. Then, in expression (16), the calculated adjustment coefficient values are employed instead of using variables; that is, $$\Delta f(x, y) = â_0 + â_1 \cos\left[\frac{\pi(2x+1)}{2N}\right] + â_2 \cos\left[\frac{\pi(2y+1)}{2N}\right] \quad (18)$$

The adjustment value calculated by expression (18) is added, via a selector 34, to the inverse-transform-operated original image signal fq(x,y) by an adder 35.

Figure 10:
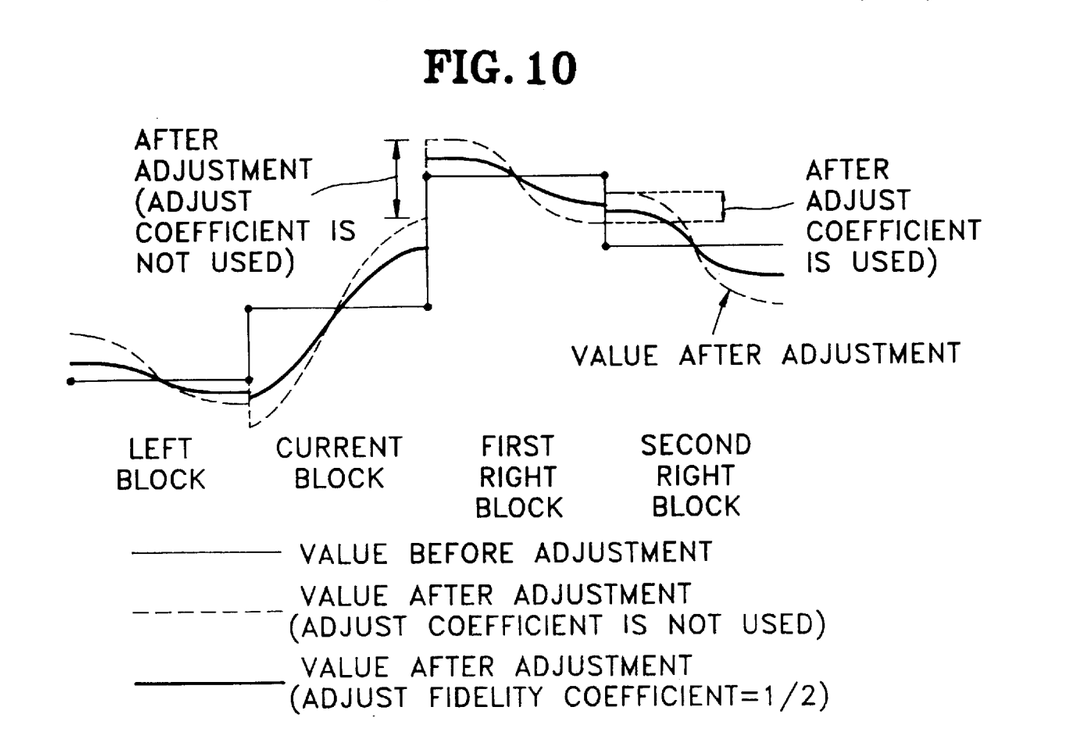
FIG. 10 illustrates a block value before and after adjustment.

At this time, since an adjustment is performed independently in each block, a spurious artifact can be generated at boundaries between the current block and the adjacent blocks. An example of this spurious artifact is shown in FIG. 10. To reduce the effect, an actual adjustment value can be calculated by employing predetermined adjustment factor coefficients $\lambda_0$, $\lambda_1$ and $\lambda_2$, as follows.

$$\Delta f(x, y) = \lambda_0 â_0 + \lambda_1 â_1 \cos\left[\frac{\pi(2x+1)}{2N}\right] + \lambda_2 â_2 \cos\left[\frac{\pi(2y+1)}{2N}\right] \quad (19)$$

In general, adjustment factor values can be defined independently for each adjustment coefficient or in common with all adjustment coefficients, i.e., $\lambda_0 = \lambda_1 = \lambda_2 = \lambda$. The proper adjustment factor values are selected.

In the meantime, when an edge exists in the inverse-transform-operated image signal fq(x,y) and the calculated adjustment value is applied to the corresponding block to eliminate a blocking artifact, the edge may be degraded, which causes image quality deterioration. Therefore, adjustment controller 33 generates an adjustment control signal so that adjustment is performed only if the current block is in a smooth area; that is, so that adjustment is not performed if the current block is in an edge area.

In doing so, adjustment controller 33 may employ an edge determiner for determining an edge by using a differential value between pixels. The present invention proposes the following two methods.

The first method uses the sum of pixel differences at block boundaries. If this sum is larger than a predetermined threshold value, it is determined that an image edge occurs and a blocking artifact is not adjusted. The method is separately applied to horizontal and vertical block boundaries.

Figure 11:
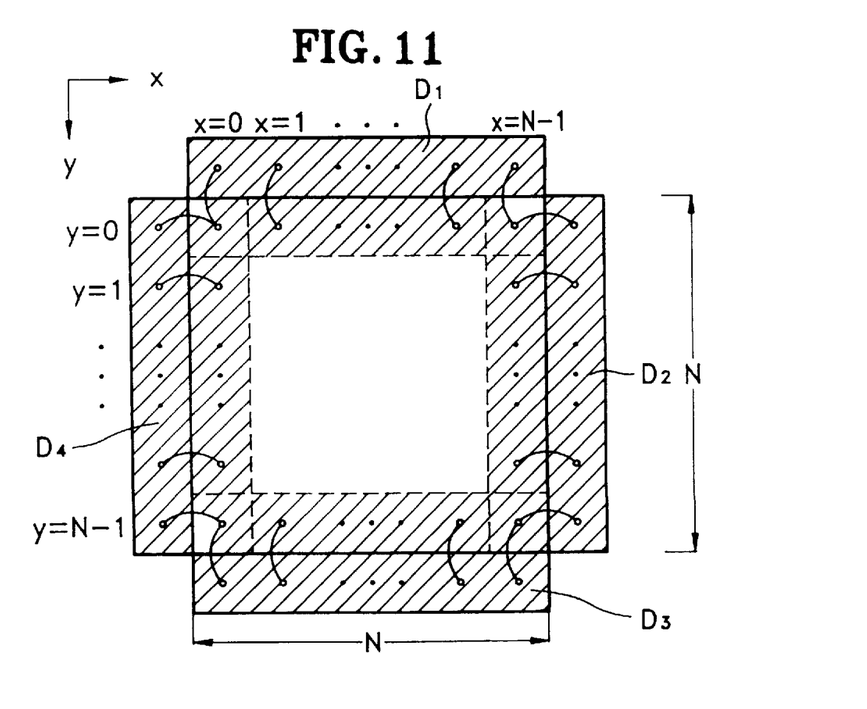
FIG. 11 illustrates a method for employing the sum of pixel differences at a block boundary.

As shown in FIG. 11, discontinuities $D_1$, $D_2$, $D_3$ and $D_4$ can be calculated by the following expressions (20) to (23), and pertain to the four basic boundaries of an N×N block.

$$D_1 = \sum_{x=0}^{N-1} [Z_1(x, N-1) - fq(x, 0)]^2 \quad (20)$$

$$D_2 = \sum_{y=0}^{N-1} [Z_2(0, y) - fq(N-1, y)]^2 \quad (21)$$

$$D_3 = \sum_{x=0}^{N-1} [Z_3(x, 0) - gq(x, N-1)]^2 \quad (22)$$

$$D_4 = \sum_{y=0}^{N-1} [Z_4(N-1, y) - fq(0, y)]^2 \quad (23)$$

Whether to perform adjustment in the horizontal direction (x-axis) is determined by comparing a horizontal threshold value $THD_1$ with the difference between the discontinuity $D_2$ (the sum of the right boundary pixel differences between the current block and block $Z_2$) and the discontinuity $D_4$ (the sum of the left boundary pixel difference between the current block and block $Z_4$).

no adjustment: $|D_2-D_4|>THD_1$ (24)

adjustment: $|D_2-D_4|<THD_1$ (25)

As can be seen in the above expressions (24) and (25), the case where the difference $|D_2-D_4|$ between adjacent blocks is larger than threshold value $THD_1$ indicates an edge area, which does not require an adjustment, and the case where the difference $|D_2-D_4|$ between adjacent blocks is smaller than threshold value $THD_1$ indicates a smooth area, which requires an adjustment.

Applying the same method, a vertical threshold value $THD_2$ is used for vertical (y-axis) adjustment, as follows.

no adjustment: $|D_1-D_3|>THD_2$ (26)

adjustment: $|D_1-D_3|<THD_2$ (27)

Adjustment controller 33 outputs an adjustment control signal indicating whether adjustment is to be performed in the vertical direction only, in the horizontal direction only, or for both directions. The adjustment control signal is applied to adjustment coefficient calculator 31 and adjustment value calculator 32. If, for example, adjustment is to be performed only in the horizontal direction (i.e., $|D_2-D_4|<THD_1$ and $|D_1-D_3|>THD_2$), adjustment coefficient calculator 31 only calculates for the $a_0$ and $a_1$ values and adjustment value calculator 32 does not adjust a frequency component in the vertical direction. That is, using expression (19), $$\Delta f(x, y) = \lambda_0 \hat{a}_0 + \lambda_1 \hat{a}_1 \cos\left[\frac{\pi(2x+1)}{2N}\right] \quad (28)$$

The adjustment value calculated by the above expression (28) is added to the inverse-transform-operated original image signal fq(x,y), to thereby output a post-processed image signal.

Figure 12:
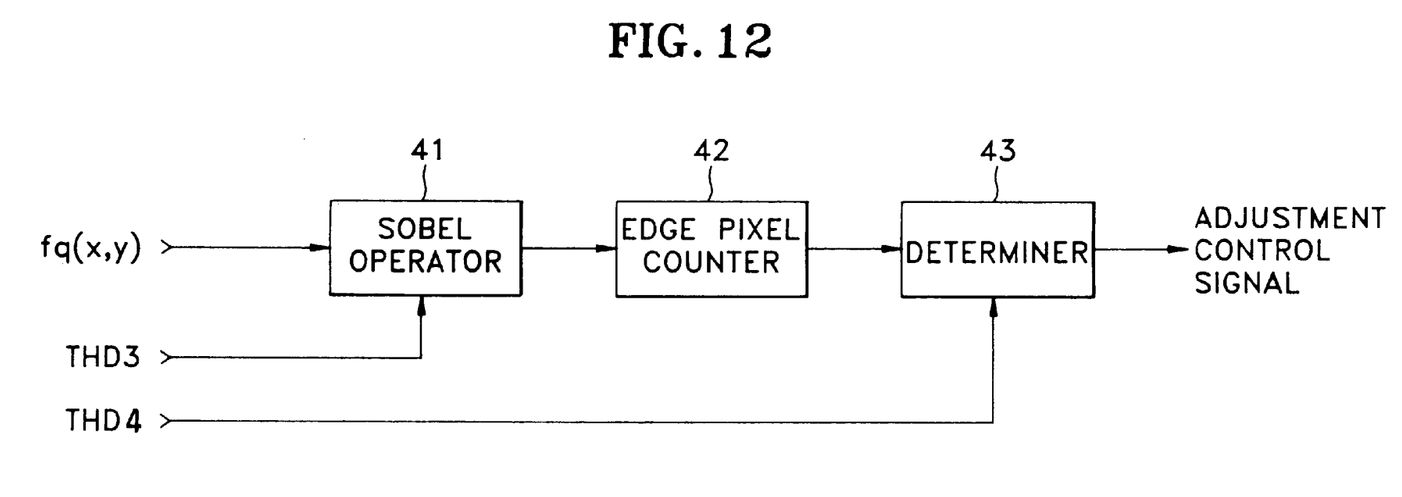
FIG. 12 is a detailed block diagram showing the adjustment controller shown in FIG. 8 employing a Sobel operator.

The second method proposed by the present invention to determine the presence of an edge employs a Sobel operator. FIG. 12 is a detailed block diagram showing an adjustment controller adopting the second method.

In FIG. 12, Sobel operator 41 receives the inverse-transform-operated original image signal fq(x,y) and a threshold value $THD_3$, compares the sum of difference between current and adjacent pixels in a window having a predetermined size with threshold $THD_3$, and determines whether the pixel has an edge component if the difference is larger than threshold $THD_3$. An edge control signal based on the determination is output to an edge pixel counter 42. (An explanation of Sobel's method for detecting an edge can be found in "Two-dimensional Signal and Image Processing" by Jae S. Lim, Prentice-Hall, 1990, pp. 478–483.) Edge pixel counter 42 calculates the number of pixels which are determined as being edge components among the $N^2$ pixels of the block. Then, the number of edges ($NE_{blk}$) in each block is compared with the allowable number of edges ($THD_4$).

$$\text{no adjustment: } |NE_{blk}| > THD_4 \quad (29)$$

$$\text{adjustment: } |NE_{blk}| < THD_4 \quad (30)$$

A determiner 43 determines whether to perform an adjustment according to the relationship shown in the above expressions (29) and (30) and outputs an adjustment control signal for simultaneously performing DC adjustment and vertical and horizontal adjustment on the adjustment value of expression (19).

To eliminate blocking artifacts more efficiently, the post-processing method of the present invention can be repeatedly performed using plural post-processing devices connected to the output of post-processing device 26, each of which perform the above-described post-processing method. At this time, different adjustment factor values are set for each post-processing device.

Since most image compression is performed by block transform operation, for example, high definition television, digital television, MPEG-1 and MPEG-2 applied products and multi-media systems, the present invention has wide applications.

As described above, according to the present invention, the device estimates transform coefficients lost during quantization, performs an inverse transform operation on the estimated signal and adds the estimated signal to the inverse-transform-operated reconstructed image signal, to thereby minimize images differences at boundary pixels. Further, horizontal and vertical adjustments are performed simultaneously with respect to block boundary differences, which enables more efficient blocking artifact elimination.

What is claimed is:

1. A post-processing device for eliminating a blocking artifact with regard to a received image signal which has been subjected to a predetermined inverse-quantizing and inverse-transform-operation by block units and reconstructing an original image, comprising:

an input terminal for receiving an inverse-transform-operated image signal;

adjustment coefficient calculating means for calculating a predetermined number of adjustment coefficients in a predetermined transform region which minimize a sum of pixel differences at boundaries between a current block of an image signal input via said input terminal and adjacent blocks;

adjustment value calculating means for calculating an adjustment value using the adjustment coefficients;

adjustment control means for determining whether the inverse-transform-operated image signal is in an edge area or in a smooth area, according to a sum of differences between boundary pixels of a current block and corresponding boundary pixels of the adjacent blocks, and outputting an adjustment control signal that determines whether to adjust said block image signal; and adding means for summing the adjustment value and the inverse-transform-operated image signal according to the adjustment control signal.

2. A post-processing device according to claim 1, wherein said predetermined transform is a discrete cosine transform (DCT).

3. A post-processing device according to claim 2, wherein the adjustment coefficients of said adjustment coefficient calculating means are a DC component and horizontal and vertical first-order cosine components of a DCT block.

4. A post-processing device according to claim 1, wherein said adjustment coefficient calculating means selects at least one adjustment coefficient among a number of adjustment coefficients corresponding to a transform block size.

5. A post-processing device according to claim 1, wherein said predetermined block transform is a Walsh-Hadamard transform (WHT).

6. A post-processing device according to claim 1, wherein said adjustment value calculating means controls the degree of adjustment by employing predetermined adjustment factor values.

7. A post-processing device according to claim 6, wherein said adjustment factor values are set according to said number of adjustment coefficients.

8. A post-processing device according to claim 6, wherein said adjustment factor values are all set as the same value.

9. A post-processing device according to claim 1, wherein the adjustment control signal generated by said adjustment control means independently controls vertical and horizontal adjustment by employing the sum of differences between boundary pixels of a current block and boundary pixels of the adjacent blocks.

10. A post-processing device according to claim 9, wherein the adjustment control signal generated by said adjustment control means determines whether to perform adjustment in the horizontal direction, and is generated by comparing the discontinuity corresponding to the sum of the differences between the boundary pixels of the current block and the boundary pixels of an adjacent right block with a discontinuity corresponding to the sum of the differences between boundary pixels of the current block and the boundary pixels of an adjacent left block.

11. A post-processing device according to claim 9, wherein the adjustment control signal generated by said adjustment control means determines whether to perform adjustment in the vertical direction, and is generated by comparing the discontinuity corresponding to the sum of the differences between boundary pixels of the current block and boundary pixels of an adjacent upper block with the discontinuity corresponding to the sum of the differences between boundary pixels of the current block and boundary pixels of an adjacent lower block.

12. A post-processing device according to claim 9, wherein the adjustment control signal generated by said adjustment control means outputs an adjustment control signal with respect to one of the vertical direction only, the horizontal direction only and both the vertical and horizontal directions.

13. A post-processing device according to claim 1, wherein said adjustment control means comprises:

- a Sobel operator for receiving said inverse-transform-operated image signal, determining whether the inverse-transform-operated image signal has an edge component and outputting an edge control signal;
- an edge pixel counter for counting the number of pixels in a block according to said edge control signal; and
- a determiner for comparing the counted number of edge pixels with a threshold value indicating the number of edge pixels allowed in a predetermined block and outputting the adjustment control signal based on the comparison result.

14. A post-processing device according to claim 13, wherein the adjustment control signal output by said determiner simultaneously adjusts vertical and horizontal directions.

15. An image decoder having a plurality of the post-processing devices of claim 1.

16. An image decoder according to claim 15, wherein each adjustment value calculating means of said plurality of post-processing devices employs the same adjustment factor values so as to control a degree of adjustment.

17. An image decoder according to claim 15, wherein each adjustment value calculating means of said plurality of post-processing devices employs different adjustment factor values so as to control a degree of adjustment.

18. A post-processing method for eliminating a blocking artifact with regard to a received image which has been subjected to a predetermined inverse-quantizing and inverse-transform-operation by block units, and reconstructing an original image, said method comprising the steps of:

(a) inputting an inverse-transform-operated image signal;

(b) selecting a predetermined number of adjustment coefficients in a region where a selected transform operation is performed;

(c) calculating adjustment coefficients for minimizing a sum of pixel differences at boundaries between a current block and adjacent blocks;

(d) calculating an adjustment value using said adjustment coefficients and adjustment factor value(s);

(e) generating an adjustment control signal for determining whether to adjust the image signal according to a result of determination of whether said inverse-transform-operated image signal is in an edge area or in a smooth area, the determination being based on differences between boundary pixels of a current block and corresponding boundary pixels of the adjacent blocks; and (f) adding said calculated adjustment value to said inverse-transform-operated image signal according to said adjustment control signal to obtain a sum signal.

19. A post-processing method according to claim 18, wherein said steps (c) through (f) are repeated using the sum signal obtained in said step (f).

20. A post-processing method according to claim 18, wherein said selected transform is a discrete cosine transform (DCT).

21. A post-processing method according to claim 20, wherein said step (b) selects a DC-component, and first-order horizontal and vertical components of the discrete cosine transform.

22. A post-processing method according to claim 20, wherein the adjustment factor values in said step (d) are determined separately for each selected transform coefficient.

23. A post-processing method according to claim 18, wherein said selected transform is a Walsh-Hadamard transform (WHT).

24. A post-processing method according to claim 18, wherein said step (d) employs a plurality of adjustment factor values all equal irrespective of corresponding transform coefficients.

* * * * *